(12) United States Patent
Huang et al.

(10) Patent No.: US 7,015,606 B2
(45) Date of Patent: Mar. 21, 2006

(54) HEAT-DISSIPATED MECHANISM FOR OUTER-ROTOR TYPE BRUSHLESS DC FAN MOTOR

(75) Inventors: Shih-Ming Huang, Hsin Chu (TW); Wen-Shi Huang, Taoyuan (TW)

(73) Assignee: Delta Electronics, Inc., (TW)

( * ) Notice: Subject to any disclaimer, the term of this patent is extended or adjusted under 35 U.S.C. 154(b) by 0 days.

(21) Appl. No.: 11/031,599

(22) Filed: Jan. 6, 2005

(65) Prior Publication Data

US 2005/0116556 A1    Jun. 2, 2005

Related U.S. Application Data

(63) Continuation of application No. 10/876,117, filed on Jun. 23, 2004, now abandoned, which is a continuation-in-part of application No. 10/178,969, filed on Jun. 24, 2002, now abandoned.

(30) Foreign Application Priority Data

May 7, 2002    (TW) ............................... 91206441 U

(51) Int. Cl.
 *H02K 21/22* (2006.01)
(52) U.S. Cl. .............................. 310/63; 310/62; 310/61
(58) Field of Classification Search .................. 310/62, 310/63, 58, 52, 51, 61, 67 R, 261, 60 R; 29/596–598
See application file for complete search history.

(56) References Cited

U.S. PATENT DOCUMENTS

| | | | | |
|---|---|---|---|---|
| 4,554,472 A | * | 11/1985 | Kumatani | 310/62 |
| 4,682,065 A | * | 7/1987 | English et al. | 310/90 |
| 5,701,045 A | | 12/1997 | Yokozawa et al. | 310/62 |
| 5,883,449 A | | 3/1999 | Mehta et al. | 310/60 R |
| 5,925,960 A | | 7/1999 | Hayes | 310/211 |
| 6,084,328 A | * | 7/2000 | Yamashita et al. | 310/90 |
| 6,384,494 B1 | | 5/2002 | Avidano et al. | 310/58 |
| 6,394,768 B1 | * | 5/2002 | Fukuda et al. | 417/423.15 |
| 6,396,117 B1 | * | 5/2002 | Furukawa et al. | 257/440 |
| 6,396,177 B1 | | 5/2002 | Shin et al. | 310/63 |
| 6,773,239 B1 | * | 8/2004 | Huang et al. | 417/354 |
| 6,815,849 B1 | * | 11/2004 | Serizawa et al. | 310/62 |

* cited by examiner

*Primary Examiner*—Darren Schuberg
*Assistant Examiner*—Leda Pham
(74) *Attorney, Agent, or Firm*—Martine Penilla & Gencarella, LLP

(57) ABSTRACT

An outer-rotor type brushless fan motor is provided, wherein the outer edge of a stator of the outer-rotor type brushless fan motor is surrounded in the cup-shaped outer periphery of a rotor case of a rotor thereof, and the rotor is rotated with respect to the stator. The outer-rotor type brushless fan motor is characterized in that at least one projection and a corresponding opening thereof are formed on a surface of the rotor case, so that the projection and the corresponding opening thereof are rotated together with the rotation of the rotor, thereby heat generated by the stator is dissipated.

16 Claims, 5 Drawing Sheets

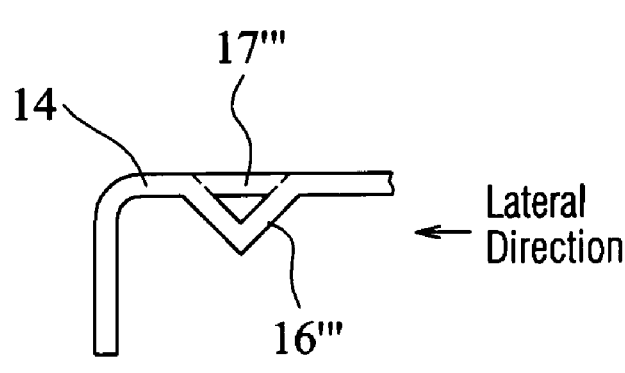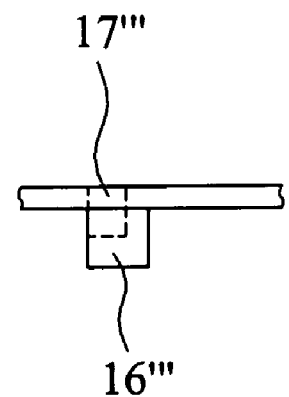
FIG. 4A   FIG. 4B
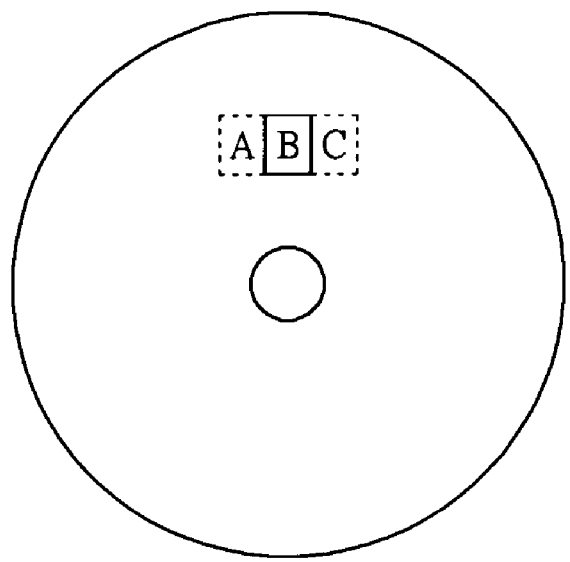
FIG. 4C

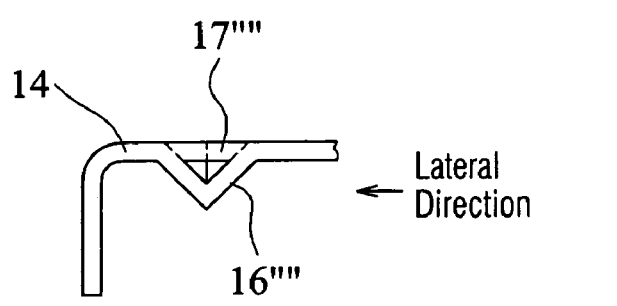
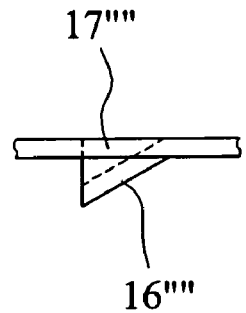
FIG. 5A  FIG. 5B
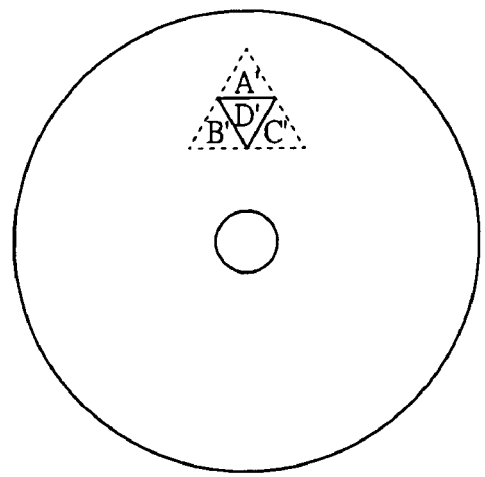
FIG. 5C
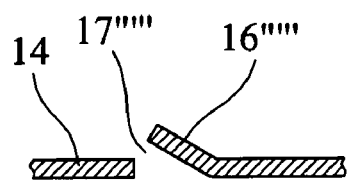
FIG. 6

HEAT-DISSIPATED MECHANISM FOR OUTER-ROTOR TYPE BRUSHLESS DC FAN MOTOR

This application claims priority under 35 U.S.C. § 120, and is a Continuation Application of pending U.S. application Ser. No. 10/876,117, filed on Jun. 23, 2004 now abandoned, which was a Continuation-In-Part of U.S. application Ser. No. 10/178,969, filed on Jun. 24, 2002 now abandoned. Each of these applications is herein incorporated by reference.

BACKGROUND OF THE INVENTION

1. Field of the Invention

The present invention relates to an outer-rotor type brushless fan motor, and more particularly, to an outer-rotor type brushless DC fan motor with forced-ventilation mechanism.

2. Description of the Related Art

Please refer to FIG. 1, a partially cross sectional view of a conventional outer-rotor type brushless DC fan motor 100 is illustrated.

As shown in FIG. 1, the conventional outer-rotor type brushless DC fan motor 100 comprises a rotor 101, a bearing assembly 201, a stator 301 and a plate 401. The rotor 101 is constituted by a shaft 102, a rotor case 104, a fan hub 103, and a permanent magnet 105 provided on an inner surface of a cup-shaped outer periphery of the rotor case 104. The bearing assembly 201 comprises at least one bearing 202 and a bearing housing 203, wherein the at least one bearing 202 is provided between the shaft 102 and an inner surface of the bearing housing 203. The stator 301 includes a plurality of silicon steel sheets 302 radially fixed to an outer surface of the bearing housing 203 and a set of coils 303 wound around each silicon steel sheet 302, wherein the cup-shaped outer periphery of the rotor case 104 encloses an outer edge of the stator 301, and the rotor 101 is rotated with respect to the stator 301. Furthermore, the plate 401 is fixed to the bearing housing 203 so as to support the outer-rotor type brushless DC fan motor 100.

However, when the conventional outer-rotor type brushless DC fan motor 100 runs, heat generated from the stator 301 enclosed in the DC fan motor 100 can not be dissipated effectively, resulting in the rated temperature of the running DC fan motor 100 being unable to reduce, and then the efficiency of the DC fan motor 100 being deteriorated at high temperature.

In view of the above, it is required an outer-rotor type brushless fan motor capable of reducing the temperature resulted from the running thereof and increasing the efficiency thereof.

SUMMARY OF THE INVENTION

Thus, it is an object of the present invention to provide an outer-rotor type brushless DC fan motor capable of reducing the temperature resulted from the running thereof and increasing the efficiency thereof.

The outer-rotor type brushless fan motor is provided according to one embodiment of the present invention, wherein a cup-shaped outer periphery of a rotor case of a rotor of the outer-rotor type brushless DC fan motor encloses an outer edge of a stator thereof, and the rotor is rotated with respect to the stator; the outer-rotor type brushless DC fan motor is characterized in that: at least one projection and an opening corresponding to the at least one projection are formed on a surface of the rotor case, so that the projection and the corresponding opening thereof are rotated together with the rotation of the rotor, thereby heat generated by the stator is dissipated.

It is preferred that the at least one projection connected to the surface of the rotor case at at least one side is inwardly configured to have a shape thereof and the opening.

A heat-dissipated mechanism for an outer-rotor type brushless DC fan motor is provided according to another embodiment of the present invention, wherein a cup-shaped outer periphery of a rotor case of a rotor of the outer-rotor type brushless DC fan motor encloses an outer edge of a stator thereof, and the rotor is rotated with respect to the stator; the heat-dissipated mechanism is characterized in that: at least one projection and an opening corresponding to the at least one projection are formed on a surface of the rotor case, so that the projection and the corresponding opening thereof are rotated together with the rotation of the rotor, thereby heat generated by the stator is dissipated.

It is preferred that the at least one projection connected to the surface of the rotor case at at least one side thereof is inwardly configured to have a shape thereof and the opening.

BRIEF DESCRIPTION OF THE DRAWINGS

FIG. 4A illustrates a cross sectional view of the projection and opening according to another modification of FIGS. 2A and 2B.

FIG. 4B illustrates a side view of the projection and opening viewed along the lateral direction in FIG. 4.

FIG. 4C illustrates the projection and opening of FIG. 4 viewed from top of the rotor case 14.

FIG. 5A illustrates a cross sectional view of the projection and opening according to still another modification of FIGS. 2A and 2B.

FIG. 5B illustrates a side view of the projection and opening viewed along the lateral direction in FIG. 5.

FIG. 5C illustrates the projection and opening of FIG. 5 viewed from top of the rotor case 14.

FIG. 6 illustrates a side view of the heat-dissipated mechanism of the outer-rotor type brushless DC fan motor according to another embodiment of the present invention.

DETAILED DESCRIPTION OF THE PREFERRED EMBODIMENT

Figure 1:
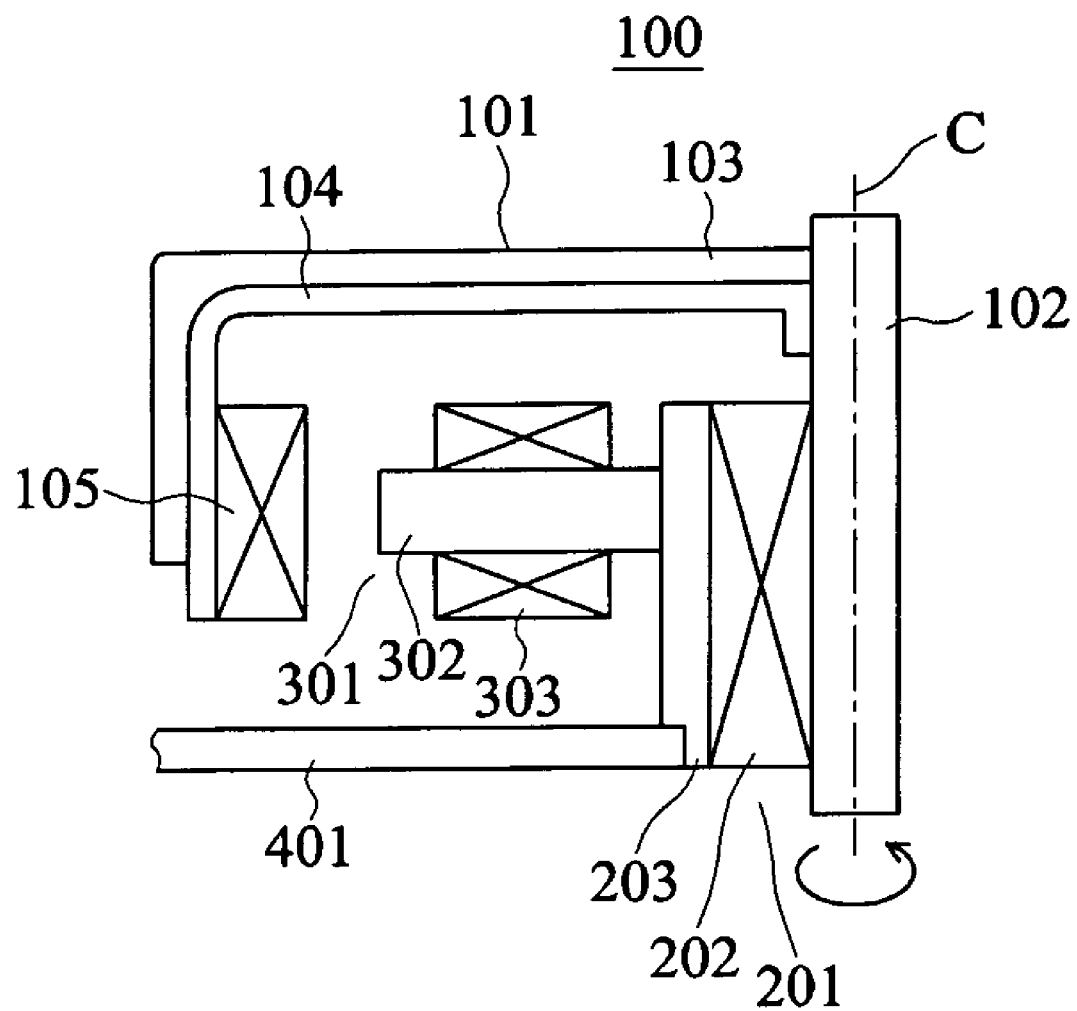
FIG. 1 illustrates a partially cross sectional view of the conventional outer-rotor type brushless DC fan motor.
Figure 2A:
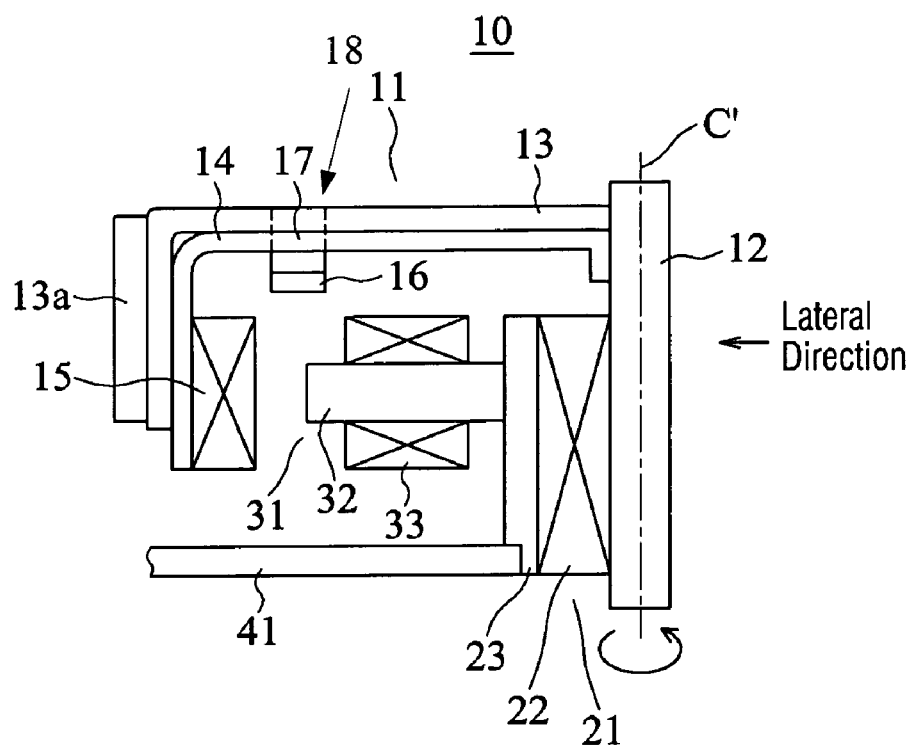
FIG. 2A illustrates a partially cross sectional view of the outer-rotor type brushless DC fan motor according to an embodiment of the present invention.

Please refer to FIG. 2A, a partially cross sectional view of an outer-rotor type brushless DC fan motor 10 according to an embodiment of the present invention is illustrated.

As shown in FIG. 2A, the outer-rotor type brushless DC motor 10 also comprises a rotor 11, a bearing assembly 21, a stator 31 and a plate 41. The rotor 11 is constituted by a shaft 12, a rotor case 14, a fan hub 13 surrounding outside the rotor case 14, and a permanent magnet 15 provided on an inner surface of a cup-shaped outer periphery of the rotor case 14. The fan hub 13 includes a set of fan blades 13a. The bearing assembly 21 comprises at least one bearing 22 and a bearing housing 23, wherein the at least one bearing 22 is provided between the shaft 12 and an inner surface of the bearing housing 23. The stator 31 includes a plurality of silicon steel sheets 32 radially fixed to an outer surface of the bearing housing 23 and a set of coils 33 wound around each silicon steel sheet 32, wherein the cup-shaped outer periphery of the rotor case 14 encloses an outer edge of the stator 31, and the rotor 11 is rotated with respect to the stator 31. Furthermore, the plate 41 is fixed to the bearing housing 23 so as to support the outer-rotor type brushless DC motor 10.

Specifically, as shown in FIG. 2A, the outer-rotor type brushless DC fan motor 10 is characterized in that at least one projection 16 and a corresponding opening 17 thereof are formed on a surface of the rotor case 14, and an aperture 18 corresponding to the position of the opening 17 is formed on the fan hub 13, so that the projection 16 and the corresponding opening 17 thereof and the aperture 18 are rotated together with the rotation of the rotor 11, thereby heat generated from the stator 31 is dissipated. The projections 16 are positioned opposing to the fan blades 13a in the radial direction of the periphery of the rotor case.

Figure 2B:
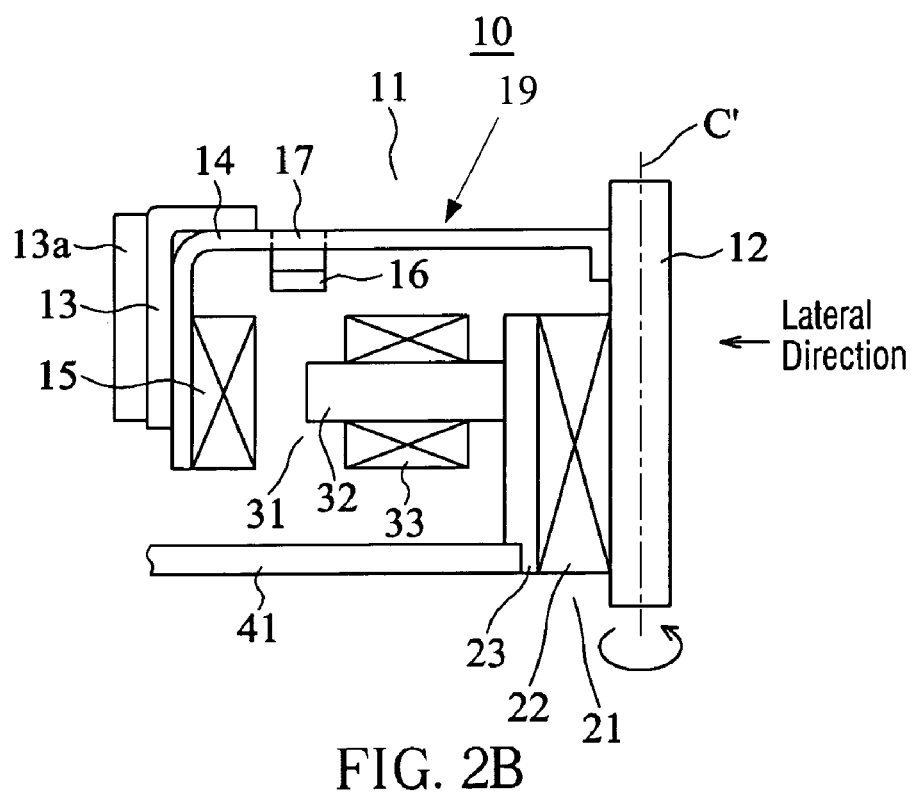
FIG. 2B illustrates a partially cross sectional view of the outer-rotor type brushless DC fan motor according to an embodiment of the present invention.

FIG. 2B shows another embodiment of the present invention where the configuration is the same as that shown in FIG. 2A except that the fan hub 13 without the corresponding openings does not cover the openings 17, and has an orifice 19 for exposing a top surface of the rotor case 14, and the projections 16 are positioned opposing to the fan blades 13a in the radial direction of the periphery of the rotor case, wherein the projection 16 and the corresponding opening 17 are formed on the top surface of the rotor case 14.

Figure 3A:
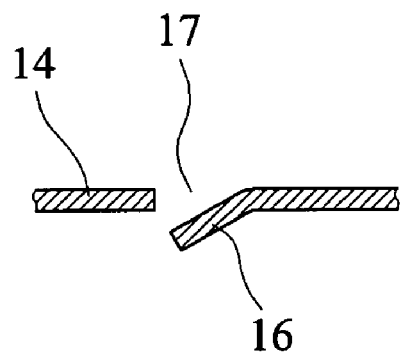
FIGS. 3A to 3C illustrate side views of the modified projections and openings viewed along the lateral direction in FIGS. 2A and 2B.
Figure 3B:
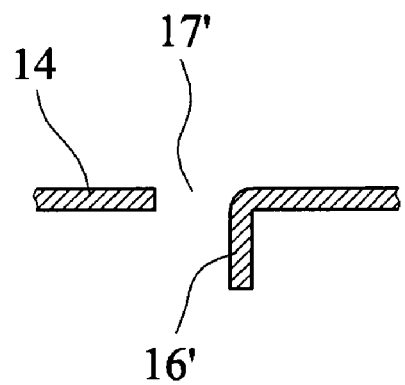

As shown in FIG. 3B, a modification of the projection 16 and opening 17 in FIG. 3A is illustrated, wherein the slope of the projection 16' becomes perpendicular to the surface of the rotor case 14, and an opening 17' is thus formed on the surface of the rotor case 14 correspondingly.

Figure 3C:
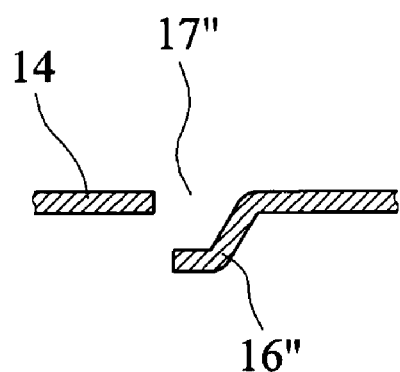

As shown in FIG. 3C, another modification of the projection 16 and opening 17 in FIG. 3A is illustrated, wherein the end of a projection 16" disconnected from the surface of the rotor case 14 forms a surface that is substantially parallel to the surface of the rotor case 14, and an opening 17" is thus formed on the surface of the rotor case 14 correspondingly.

Please refer to FIGS. 4A and 4B, a projection 16'" and opening 17'" according to another modification of FIGS. 2A and 2B are illustrated. FIG. 4B illustrates a side view of the projection 16'" and opening 17'" viewed along the lateral direction in FIG. 4A. FIG. 4C further shows the projection 16'" and opening 17'" from top of the rotor case 14. As shown in FIG. 4C, the rotor case 14 at areas A and C are cut except for the sides of the areas A and C connected to area B (the cut-out sides of the areas A and C are shown in dashed lines) and folded inwardly to form the projection 16'" with trignoal prism shape and the opening 17'" is thus formed on the areas A and C. As shown in FIGS. 4A and 4B, the projection 16'" connected to the surface of the rotor case 14 at two sides is inwardly configured to have a trigonal prism shape thereof and the opening 17'". Preferably, the projection 16'" and opening 17'" are configured by means of stamping.

Please refer to FIGS. 5A and 5B, a projection 16"" and opening 17"" according to still another modification of FIGS. 2A and 2B are illustrated. FIG. 5B illustrates a side view of the projection 16"" and opening 17"" viewed along the lateral direction in FIG. 5A. FIG. 5C further shows the projection 16"" and opening 17"" from top of the rotor case 14. As shown in FIG. 5C, the rotor case 14 at areas A', B', and C' are cut except for the sides of the areas A', B', and C' connected to area D (the cut sides of the areas A', B', and C' are shown in dashed lines) and folded inwardly to form the projection 16"" with trignoal prism shape and the opening 17"" is thus formed on the areas A', B', and C'. As shown in FIGS. 5A and 5B, the projection 16"" disconnected to the surface of the rotor case 14 merely at one side is inwardly configured to have a trigonal pyramid shape thereof and the opening 17"". Preferably, the projection 16"" and opening 17"" are configured by means of stamping.

It is to be appreciated that one of ordinary skill in the art can change or modify the embodiment or the modifications without departing from the spirit of the present invention. For example, FIG. 6 illustrates the heat-dissipated mechanism of the outer-rotor type brushless DC fan motor 10 according to another embodiment of the present invention, wherein a projection 16'"" connected to the surface of the rotor case 14 at one side is outwardly configured to have a shape thereof and an opening 17'"". Further, the modifications of FIG. 6 can be accomplished easily by persons skilled in the art by referring to FIGS. 3A to 3C, 4A and 5A.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An outer-rotor type brushless DC fan motor, wherein a rotor case of a rotor of the outer-rotor type brushless DC fan motor encloses a stator thereof, a set of fan blades is provided at the outer periphery of the rotor case;
   the outer-rotor type brushless DC fan motor is characterized in that:
   at least one projection and an opening corresponding to the at least one projection are formed on a surface of the rotor case, so that the projection and the corresponding opening thereof are rotated together with the rotation of the rotor, thereby heat generated by the stator is dissipated, wherein the at least one projection is configured in one of a trigonal prism shape and a trigonal pyramid shape.

2. The motor as recited in claim 1, wherein the at least one projection is positioned opposing to the fan blades in the radial direction of the periphery of the rotor case.

3. The motor as recited in claim 1, wherein the at least one projection is inwardly or outwardly protruded out of the surface of the rotor case at at least one side.

4. The motor as recited in claim 1, wherein one end of the at least one projection has an inclined or rectangular angle relative to the surface of the rotor case.

5. An outer-rotor type brushless DC fan motor, wherein a rotor case of a rotor of the outer-rotor type brushless DC fan motor encloses a stator thereof, a fan hub containing a set of fan blades is provided at the outer periphery of the rotor case;
   the outer-rotor type brushless DC fan motor is characterized in that:
   at least one projection and an opening corresponding to the at least one projection are formed on the rotor case and the hub, so that the projection and the corresponding opening thereof are rotated together with the rotation of the rotor, thereby heat generated by the stator is dissipated, wherein the at least one projection is configured in one of a trigonal prism shape and a trigonal pyramid shape.

6. The motor as recited in claim 5, wherein the at least one projection is positioned opposing to the fan blades in the radial direction of the periphery of the rotor case.

7. The motor as recited in claim 5, wherein the at least one projection is inwardly or outwardly protruded out of the surface of the rotor case at at least one side.

8. The motor as recited in claim 5, wherein one end of the at least one projection has an inclined or rectangular angle relative to the surface of the rotor case.

9. A heat-dissipated mechanism comprising:
a stator;
a rotor case enclosing the stator;
a hub surrounding outside the rotor case; and
a plurality of fan blades provided at the outer periphery of the hub;
wherein at least one projection and an opening corresponding to the at least one projection are formed on the rotor case, and an aperture corresponding to the position of the opening is formed on the hub, so that the projection, the corresponding opening and the corresponding aperture are rotated to dissipate heat generated by the stator.

10. The heat-dissipated mechanism as recited in claim 9, wherein the at least one projection is configured in one of a trigonal prism shape and a trigonal pyramid shape, and the at least one opening is configured in one of a trigonal shape and a tetragonal shape.

11. The heat-dissipated mechanism as recited in claim 9, wherein the at least one projection is inwardly or outwardly protruded out of the surface of the rotor case at at least one side.

12. The heat-dissipated mechanism as recited in claim 9, wherein one end of the at least one projection has an inclined or rectangular angle relative to the surface of the rotor case.

13. The heat-dissipated mechanism as recited in claim 9, wherein one end of the at least one projection is connected to the surface of the rotor case and the other end disconnected from the surface of the rotor case forms a surface that is substantially parallel to the surface of the rotor case.

14. A heat-dissipated mechanism comprising:
a stator;
a rotor case enclosing the stator;
a hub surrounding outside the rotor case and having an orifice for exposing a top surface of the rotor case outside; and
a plurality of fan blades provided at the outer periphery of the hub;
wherein at least one projection and an opening corresponding to the at least one projection are formed on the top surface of the rotor case, so that the projection and the corresponding opening thereof are rotated to dissipate heat generated by the stator, wherein the at least one projection is configured in one of a trigonal prism shape and a trigonal pyramid shape, and the at least one opening is configured in one of a trigonal shape and a tetragonal shape.

15. The heat-dissipated mechanism as recited in claim 14, wherein the at least one projection is inwardly or outwardly protruded out of the surface of the rotor case at at least one side.

16. The heat-dissipated mechanism as recited in claim 14, wherein one end of the at least one projection has an inclined or rectangular angle relative to the surface of the rotor case.

* * * * *